United States Patent
Babka et al.

[11] Patent Number: 5,262,185
[45] Date of Patent: Nov. 16, 1993

[54] CHICKEN FRYING PROCESS

[75] Inventors: James R. Babka; Daniel P. Kvedoras, both of Omaha, Nebr.; Charles Y. Park, Summerville, Ga.

[73] Assignee: ConAgra, Inc., Omaha, Nebr.

[21] Appl. No.: 845,735

[22] Filed: Mar. 2, 1992

Related U.S. Application Data

[63] Continuation of Ser. No. 610,790, Nov. 8, 1990, abandoned.

[51] Int. Cl.$^5$ ............................................ A23L 1/315
[52] U.S. Cl. .................................... 426/291; 426/292; 426/293; 426/296; 426/438; 426/441; 426/644
[58] Field of Search ............... 426/92, 644, 438, 523, 426/291, 293, 296, 302, 441, 292

[56] References Cited

U.S. PATENT DOCUMENTS

| | | | |
|---|---|---|---|
| 3,169,069 | 2/1965 | Hanson et al. | 426/296 X |
| 3,337,346 | 8/1967 | Barker et al. | 426/296 |
| 3,353,962 | 11/1967 | Smith | 426/438 X |
| 3,462,278 | 8/1969 | Mahon . | |
| 3,501,316 | 3/1970 | Guthrie | 426/644 X |
| 3,522,058 | 7/1970 | Libby | 426/644 |
| 3,653,924 | 4/1972 | Penton | 426/644 X |
| 4,012,808 | 3/1977 | Strong | 426/644 X |
| 4,208,442 | 6/1980 | Evans et al. | 426/293 X |
| 4,367,242 | 1/1983 | Jarvis et al. | 426/293 |
| 4,511,583 | 4/1985 | Olson et al. | 426/291 X |
| 4,749,579 | 6/1988 | Haydock et al. . | |
| 4,842,874 | 6/1989 | D'Amico et al. | 426/291 X |
| 4,847,099 | 7/1989 | Elinsky . | |
| 4,940,590 | 7/1990 | Williams et al. | 426/644 X |

FOREIGN PATENT DOCUMENTS 1-171461  7/1989  Japan .

*Primary Examiner*—Arthur L. Corbin
*Attorney, Agent, or Firm*—Willian Brinks Olds Hofer Gilson & Lione

[57] ABSTRACT

Fried chicken is prepared by marinating uncooked chicken parts and then searing in water to release fat from the chicken parts and to make the chicken parts tacky. Predust, batter and breading are then applied to the seared chicken parts and the coated chicken parts are fried in oil to set the coating with minimal oil absorption. Then the seared, coated and fried chicken parts are oven cooked until fully cooked and fat is removed from the chicken parts during the oven cooking step. The resulting product has been found to have no more than about 230 calories, 80 milligrams of cholesterol, and 10 grams of fat per 3.5 ounce portion.

14 Claims, 1 Drawing Sheet

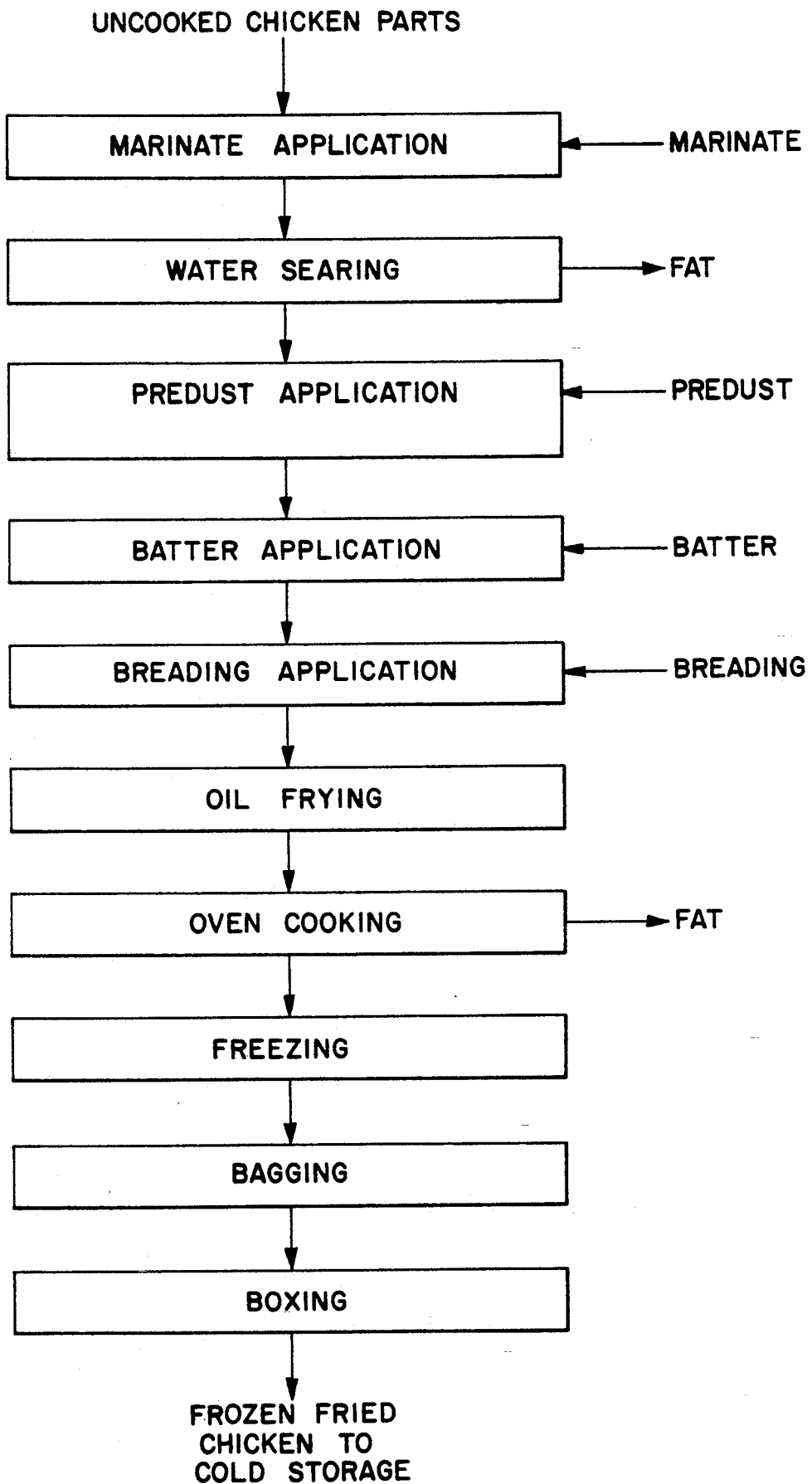

CHICKEN FRYING PROCESS

This application is a continuation of application Ser. No. 07/610,790, filed Nov. 8, 1990, now abandoned.

BACKGROUND OF THE INVENTION

This invention relates to a method for preparing fully cooked fried chicken which is low in calories, cholesterol and fat as compared with U.S. Department of Agriculture data for cooked, fried, batter-dipped chicken, and to the resulting fully cooked fried chicken Fried chicken is popular, but as conventionally cooked it is higher in calories and fat than desired by some consumers. According to data published by the U.S. Department of Agriculture, a 3.5 oz. portion of cooked, fried, batter-dipped chicken has 289 calories, 87 milligrams of cholesterol and 17 grams of fat.

Various approaches have been used in the past to prepare fried chicken, including frying and a combination of frying and oven cooking. Additionally, water searing steps have been combined with oven cooking steps in selected cooking processes.

A need exists for a lower fat, fully cooked fried chicken, and the present invention addresses this need.

SUMMARY OF THE INVENTION

According to the method of this invention, fried chicken is prepared by first providing a quantity of uncooked chicken parts, preferably partially covered by chicken skin. The chicken parts are seared in water to release fat from the chicken parts and to make the chicken parts tacky. Then a coating selected from the group consisting of predust, batter, breading, and combinations thereof is applied to the seared chicken parts, and the coated chicken parts are fried in oil to set the coating on the chicken parts. The fried, coated and seared chicken parts are then oven cooked until the chicken parts are fully cooked.

The method of this invention produces a fried chicken which is lower in fat, cholesterol, and calories than U.S.D.A. published data. In particular, chicken cooked in accordance with the method described below has been tested and found to have no more than about 230 calories, 80 milligrams of cholesterol, and 10 grams of fat per 3.5 ounce portion. The present invention is directed to the fully cooked, fried, batter dipped chicken produced by the method of this invention, as well as to the method itself.

The invention itself, together with further objects and attendant advantages, will best be understood by reference to the following detailed description, taken in conjunction with the drawing.

BRIEF DESCRIPTION OF THE DRAWING

The present application includes a single figure which represents a flow diagram of the preferred embodiment of the method of this invention.

DETAILED DESCRIPTION OF THE PREFERRED EMBODIMENTS

In this example, 1,000 lbs. of uncooked chicken parts are processed in a novel way to produce an unusually low fat, low calorie, low cholesterol, batter dipped fried chicken. In this example, the chicken parts are fresh, and they are processed with the skin on, but with the leaf and tail fat removed. A standard eight piece cut up may be used.

In the first step of the illustrated process, marinate is applied to the uncooked chicken parts. This is preferably done in a vacuum tumbler having a 2,000 lb. capacity. The vacuum tumbler manufactured by Johnson Manufacturing Company has been found to be suitable. One hundred twenty pounds of marinate are added, and the marinate and chicken parts are tumbled for 10 to 12 minutes under a vacuum of 22 inches of mercury. The presently preferred marinate is a solution of 94.5 weight percent water, 3 weight percent salt and 2.5 weight percent sodium phosphate. At the completion of the marinate application step, the marinated chicken parts are removed from the tumbler and placed into stainless steel buckets for transport. Typically, about 96 percent of the marinate is absorbed by the chicken parts during the marination step.

The marinated chicken parts are then transported via the buckets to a water searing step, in which the marinated chicken parts are immersed in water at a temperature of about 200° F. for approximately two minutes. This step is preferably performed in a fryer of the type distributed by Stein Mfg. Co., which is used to heat a water rather than an oil bath. Preferably, the chicken parts are transported through the water bath on a conveyor belt which positively immerses the chicken parts in the heated water. In order to optimize the appearance of the processed chicken, the skin on the breast and thighs should be laid smooth prior to searing, the wings should be tucked prior to searing, and close attention should be given to remove folds on the skin of the chicken parts, especially the legs. At the end of the searing step the internal temperature of the chicken parts is preferably about 110° F.

The searing step performs two important functions. First, it removes fat from the chicken parts, and particularly from the skin of the chicken parts. This fat is liquefied by the heated water, and the fat is skimmed off the water into a skimmer trough, from which it is removed. The second major purpose of the water searing step is to cause the outer surface of the chicken parts to become tacky, to improve adherence of batter and breading. In general, the water searing step should be adjusted to heat the chicken parts sufficiently to render the outer surface of the chicken parts tacky, but not to heat the chicken parts so much as to cause the skin to become tough and separated from the chicken parts.

After the chicken parts have been seared, they are then transported (again in buckets) to the predust application step. Predusting is performed preferably with a Stein Preduster followed by a tumbler, flatbed, or flip unit. A wide variety of predust may be used, but the predust supplied by McCormick Spice Company as Predust No. F18669 is presently preferred. The presently preferred predust is formed of a wheat flour enriched with niacin, iron, thiamine, mononitrate and riboflavin; salt; egg whites; wheat gluten; monosodium glutamate; spices and garlic powder. The predust step is preferably arranged such that predust adheres to the seared chicken parts sufficiently to increase the weight of the seared chicken parts by 7 to 8 weight percent.

After the predust has been applied, batter is then applied to the predusted chicken parts in a batter application step. This is preferably done with a Stein 34 inch batter applicator that uses conveyor belts to dip the seared product into the batter. A wide variety of batters are suitable; however, the presently preferred embodiment utilizes a dry powdered batter mix supplied by McCormick Spice Company as Batter No. CL658-24 or CL658-25 which is mixed with sufficient water to achieve a batter viscosity of 7 to 9 as measured with the standard Stein viscosity measuring cup. Preferably, the viscosity of the batter is arranged to cause the predusted chicken parts to pick up approximately 10 to 12 weight percent of batter in the batter application step. The presently preferred batter is formed of water; wheat flour enriched with niacin, iron, thiamine, mononitrate and riboflavin; corn starch; whey; salt; corn flour; spices; monosodium glutamate; leavening (sodium bicarbonate, sodium aluminum phosphate, monocalcium phosphate); hydrolyzed vegetable protein; garlic powder; disodium inosinate; and disodium guanylate.

Breading is then applied to the battered chicken parts in a breading application step that is preferably accomplished using a Stein XL breader. A variety of breadings may be used, but the breading supplied by McCormick Spice Company as Breading No F18671 is presently preferred. The presently preferred breading is formed of wheat flour enriched with niacin, iron, thiamine, mononitrate and riboflavin; salt; spices; monosodium glutamate and garlic powder. The preferred Stein breader is a single pass unit that sifts breading onto the bed and onto the chicken parts, and then uses a roller to embed the breading into the chicken parts. Preferably the amount of breading added to the chicken parts represents 10-12 weight percent of the battered chicken parts.

After breading has been applied, the chicken parts are transferred by conveyor to an oil frying step. During this conveyor transfer, a Stein conveyor belt shaker is preferably used to remove excess breading from the chicken parts prior to frying. The frying step is preferably performed in a Stein 34 inch frier by immersing the breaded chicken parts in 100% vegetable oil at a temperature of 350° F. for approximately 2½ minutes. In general, the duration of the frying step is preferably held to a minimum in order to minimize the amount of oil absorbed by the chicken parts. One of the primary functions of the frying step is to set the breading on the chicken parts to hold the breading in place, without allowing the chicken parts to pick up excessive oil. The frying step should maintain the chicken parts in the heated oil for a sufficient time to accomplish this purpose.

The fried chicken parts are then conveyed by belt to an oven to complete the cooking process. Preferably, the belt is provided with a sufficient length to allow the fried chicken parts to rest. A 90 second rest period has been found suitable. During this period oil drips from the chicken parts, and is in this way removed from the finished product.

The oven cooking step is preferably performed in a conveyor oven, as for example, a Stein 40" 60 foot counter flow oven. The preferred oven provides high humidity during the early parts of the oven cooking step and dry heat near the end of the oven cooking step. Any suitable heat source may be used, such as natural gas. Oven cooking is preferably continued until the minimum internal temperature of the chicken parts reaches 175° F., as measured at the thigh joint. This can be accomplished by maintaining the oven at 290° F. and by maintaining the chicken parts in the oven for approximately 35 minutes. As the chicken parts are oven cooked, oil continues to drip off, which further reduces the fat content of the chicken parts. As the chicken parts emerge on the conveyor from the oven, they are preferably shaken by a means of a conveyor belt shaker to eliminate excess crumbs and to separate parts. A suitable conveyor shaker can be obtained from Stein.

The next step is a freezing step, in which the fully cooked chicken parts are introduced into a freezer such as a mechanical freezer of the type supplied by FRIGOSCANDIA under the trade name Gyro Compact Freezer. Freezing is continued until the chicken parts reach an internal temperature of 0° F. as measured at the thigh joint.

The frozen chicken then passes through a metal detector, such as a conventional metal detector supplied by Barkley Dexter, and any chicken parts containing metal are eliminated. The frozen chicken parts are then placed on a carousel table, and they are bagged in a hand bagging operation. For example, 24 pieces can be placed in a single bag and a plastic bag clip applied to close the bag. Preferably, the chicken parts are inspected prior to bagging, and chicken parts having voids in the breading coating are rejected.

The bagged chicken parts are then boxed and weighed, and the boxes are shaken to settle the chicken parts, taped, labeled, palletized and sent to cold storage at a temperature of 0° F.

From the foregoing description it should be apparent that water searing, frying, and oven cooking have all been combined to prepare breaded, fried, fully cooked chicken. The resulting chicken has been tested and found to be low in calories, cholesterol and fat, as compared with published U.S.D.A. data. The process described above has been found to produce fully cooked fried chicken which has no more than about 230 calories, no more than about 80 milligrams of cholesterol, and no more than about 10 grams of fat per 3.5 ounce portion. In spite of the reduced calorie, fat, and cholesterol content of this chicken, it has the appearance, taste and feel of conventional fried chicken.

Of course, it should be understood that a wide range changes and modifications can be made to the preferred embodiment described above. For example, if the intended application does not require extended shelf life, the freezing step may be eliminated, and the bagging and boxing steps may be modified as appropriate. Furthermore, if further reductions in fat, cholesterol and calories are required, chicken parts may be used which do not have skin on them. Of course, the particular marinate, breading, predust and batter can all be modified as appropriate for the application, and other types of equipment may be used to accomplish the general functions set out above. It is therefore intended that the foregoing detailed description be regarded as illustrative rather than limiting, and that it be understood that it is the following claims, including all equivalents, which are intended to define the scope of this invention.

We claim:

1. A method for preparing fried chicken consisting essentially of the following steps:
   a) providing a quantity of uncooked chicken parts;
   b) marinating the uncooked chicken parts with a salt containing marinade;
   c) searing the uncooked chicken parts in water to release fat from the chicken parts and to make the chicken parts tacky;
   d) applying a coating selected from the group consisting of predust, batter, breading and combinations thereof to the seared chicken parts;
   e) frying the coated, seared chicken parts in oil to set the coating on the chicken parts; and then f) oven cooking the fried, coated and seared chicken parts until the chicken parts are fully cooked;

steps b)-f) cooperating to maintain the fat content of the fully cooked chicken parts at not more than about 10 grams per 3.5 ounce portion.

2. The method of claim 1 wherein the chicken parts are partially covered by chicken skin.

3. The method of claim 2 wherein the chicken parts are immersed in water at a temperature of about 200° F. for about 2 minutes in the searing step.

4. The method of claim 3 wherein the coating applied in the applying step adds at least about 25% to the weight of the seared chicken parts.

5. The method of claim 4 wherein the chicken parts are immersed in oil at a temperature of about 350° F. for about 2½ minutes in the frying step to minimize oil absorption by the chicken parts.

6. The method of claim 5 wherein the chicken parts are cooked at a temperature of about 290° F. for about 35 minutes in the oven cooking step, and wherein oil is removed from the chicken parts during the oven cooking step.

7. The method of claim 1 further comprising the step of freezing the fully cooked chicken parts.

8. The method of claim 1 wherein steps b)-f) are effective to maintain the cholesterol content of the fully cooked chicken parts at no more than about 80 milligrams per 3.5 ounce portion.

9. The method of claim 8 wherein steps b)-f) are effective to maintain the caloric content of the fully cooked chicken parts at no more than about 230 calories per 3.5 ounce portion.

10. A method for preparing cooked fried chicken consisting essentially of the following steps:
   a) providing a quantity of uncooked chicken;
   b) introducing about 12 weight percent of a salt containing marinade into the chicken parts;
   c) searing the marinated chicken parts in water at a temperature of about 200° F. for about 2 minutes to release fat from the chicken parts and to make the chicken parts tacky;
   d) applying a coating of at least about 25 weight percent of predust, batter and breading to the seared chicken parts;
   e) frying the coated, seared chicken parts in vegetable oil at a temperature of about 350° F. for about 2½ minutes to set the coating on the chicken parts without excessive oil absorption by the chicken parts; and then
   f) oven cooking the fried, coated and seared chicken parts at a temperature of about 290° F. for about 35 minutes until the chicken parts are fully cooked, wherein oil is removed from the chicken parts during the oven cooking step;

steps b)-f) cooperating to maintain the fat content of the fully cooked chicken parts at no more than about 10 grams per 3.5 ounce portion.

11. The method of claim 10 wherein the chicken parts are partially covered by chicken skin.

12. The method of claim 10 further comprising the step of freezing the fully cooked chicken parts.

13. The method of claim 10 wherein steps b)-f) are effective to maintain the cholesterol content of the fully cooked chicken parts at no more than about 80 milligrams per 3.5 ounce portion.

14. The method of claim 13 wherein steps b)-f) are effective to maintain the caloric content of the fully cooked chicken parts at no more than about 230 calories per 3.5 ounce portion.

* * * * *